US008152488B2

(12) United States Patent
Fang

(10) Patent No.: US 8,152,488 B2
(45) Date of Patent: Apr. 10, 2012

(54) BLOWER

(75) Inventor: Chuan Hui Fang, Hong Kong (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 872 days.

(21) Appl. No.: 11/822,960

(22) Filed: Jul. 11, 2007

(65) Prior Publication Data

US 2008/0014080 A1 Jan. 17, 2008

(30) Foreign Application Priority Data

Jul. 12, 2006 (GB) .................................. 0613796.2

(51) Int. Cl.

*F04B 39/02* (2006.01)
*F04B 39/06* (2006.01)
*F03B 1/00* (2006.01)
*F03B 11/02* (2006.01)
*F03D 5/00* (2006.01)

(52) U.S. Cl. .................................... 417/366; 415/208.3

(58) Field of Classification Search .................. 417/366, 417/423.1; 415/193, 194, 208.1, 208.2, 211.1, 415/211.2, 208.3, 208.4

See application file for complete search history.

(56) References Cited

U.S. PATENT DOCUMENTS 4,679,990 A * 7/1987 Yamaura et al. .............. 417/312
4,767,285 A * 8/1988 Jyoraku et al. ................ 417/366
6,703,754 B1 * 3/2004 Finkenbinder et al. ....... 310/227
D534,645 S * 1/2007 Tateishi et al. ............... D23/411
7,334,987 B2 * 2/2008 Oh et al. .................... 415/211.1

FOREIGN PATENT DOCUMENTS

DE 19605742 A1 8/1997
EP 0602007 B1 6/1994
EP 1 618 821 A2 1/2006
EP 1627590 A3 2/2006
KR 1020050114069 * 11/2005

OTHER PUBLICATIONS

Ou Jiansheng, "Exploration of Design of Cleaner Blowers (II)," Household Applicance Technology, No. 1, pp. 12-14, Feb. 28, 1991.

* cited by examiner

*Primary Examiner* — Devon C Kramer
*Assistant Examiner* — Peter J Bertheaud
(74) *Attorney, Agent, or Firm* — Birch, Stewart, Kolasch & Birch, LLP

(57) ABSTRACT

A blower for a vacuum cleaner has a diffuser with an increased efficiency by coupling the attack angle A of the diffuser vanes with the attack angle B of the return guide vanes where angle A is between 4° and 6° and angle B is between 6° and 20°.

16 Claims, 4 Drawing Sheets

BLOWER

CROSS-REFERENCE TO RELATED APPLICATIONS

This non-provisional patent application claims priority under 35 U.S.C. §119(a) from Patent Application No. 0613796.2 filed in Great Britain on 12 Jul. 2006.

BACKGROUND OF THE INVENTION

This invention relates to a blower as used in a vacuum cleaner or the like and in particular to a diffuser of the blower.

In a vacuum cleaner, air is moved to pick up dirt, dust and debris and deliver it to a dirt container, usually in the form of a filter bag supported within a canister. To cause the air flow, a blower is used to create a vacuum. Hence, the blower is also known as a vacuum motor or vacuum cleaner motor.

The blower motor comprises a motor, typically an electric motor and of the electric motors, universal motors are commonly preferred although PMDC motors and brushless DC motors, switched reluctance motors and induction motors have been used. Generally, universal motors are preferred for domestic applications due to the lower cost and good reliability features but recently also because of their ability to operate at higher speeds in excess of 20,000 rpm, sometimes even greater than 40,000 rpm. The trend towards high speeds which allows the size of the motor to be reduced while keeping the volume of air flow and/or maximum suction high making the overall weight of the vacuum cleaner lighter.

The motor drives an impeller which creates the air flow. The impeller is fitted to the shaft of the motor and has a cover which defines the suction inlet or inlet port for the blower. A diffuser plate guides the air from the impeller through the motor where it is exhausted through openings in the motor housing after cooling the motor. This type of construction is known as a flow-through construction as the air flows through the motor. The alternative construction is known as a bypass construction, as the air bypasses the motor. This type of construction is used in wet and dry type vacuum cleaners.

The construction of the diffuser is very important as it affects the efficiency of the blower. A highly efficient diffuser can increase the volume of air being moved or reduces the power required to move the same volume of air. Hence, as the trend for smaller, lighter motors continues, the desire for a more efficient diffuser is obvious.

One such diffuser development is described in EP0602007 where the relationship between the impeller and the diffuser is investigated with the result that the vanes on the diffuser which surround the impeller, should have an inlet angle, that is the angle that a diffuser vane makes with a tangent to the impeller, of between 1° to 4°.

BRIEF SUMMARY OF THE INVENTION

We have discovered that in a flow through blower the efficiency can be increased by using an inlet angle of between 4° and 6° when combined with a return guide vane angle of between 6° and 20°. The return guide vane angle is the angle that the vanes on the side of the diffuser opposite to the impeller, known as the return guide vanes, make with a tangent to the diffuser at the outer end of the return guide vanes or at least to a circle joining the outer ends of the return guide vanes.

Accordingly, the present invention provides a blower for a vacuum cleaner or the like, comprising: a housing; an electric motor accommodated within the housing and having a stator and a rotor; an impeller fixed to the rotor for rotation therewith; a diffuser located at a first end of the housing and located between the impeller and the housing; and a cover, fixed to the first end of the housing and covering the diffuser and impeller, the cover having an aperture forming an inlet port for the impeller; wherein the diffuser has a plate like portion which extends adjacent a rear surface of the impeller and having on one side thereof at a peripheral edge, a plurality of diffuser vanes extending perpendicularly from the plate like portion and extending along respective curves from adjacent a peripheral edge of the impeller to a peripheral edge of the diffuser and having therebetween a plurality of passageways and having on a second surface thereof a plurality of return guide vanes extending perpendicularly from the plate like portion and following respective curves from the peripheral edge of the diffuser to a radially intermediate location and forming a second plurality of passageways therebetween for leading air from the periphery of the diffuser, inwardly towards and into the housing to cool the motor; and wherein the diffuser vanes make an angle A with the impeller and the return guide vanes make an angle B with the outer edge of the diffuser such that angle A is in the range of 4° to 6° and angle B is in the range of 6° to 20°.

Preferably, the first end of the housing is open and a bearing bracket spans the first end and supports a bearing for the shaft of the rotor and the diffuser is fixed to the bearing bracket.

Preferably, the housing has a flange at the first end and the bearing bracket is fixed to the flange and has an axially extending ring located radially outwardly of the flange and the cover is fixed to said ring.

Preferably, the cover closes one side of the diffuser vane passageways and the bearing bracket closes one side of the return guide vane passageways.

Preferably, an annular space exists between the radially outer edge of the diffuser and the cover.

Preferably, the angle A is 5° and the angle B is 10°.

Preferably, the diffuser has 15 diffuser vanes and 16 return guide vanes.

Preferably, the curve of the return guide vanes is formed by smoothly joining a first arc with a second arc, the first arc forming a trailing portion of the return guide vane and the second arc forming a leading portion of the return guide vane.

Preferably, the second arc has a radius which is greater than the radius of the first arc.

Preferably, the radius of the second arc is twice the radius of the first arc.

Preferably, the first arc and the second arc meet at a tangent.

Preferably, the first and second arcs each have a center lying on a common radial line.

Preferably, the length of the first arc is three to six times the length of the second arc.

Preferably, the length of the first arc is four times the length of the second arc.

BRIEF DESCRIPTION OF THE DRAWINGS

One preferred embodiment of the present invention will now be described, by way of example only, with reference to the accompanying drawings, in which.

DETAILED DESCRIPTION OF THE PREFERRED EMBODIMENTS

Figure 1:
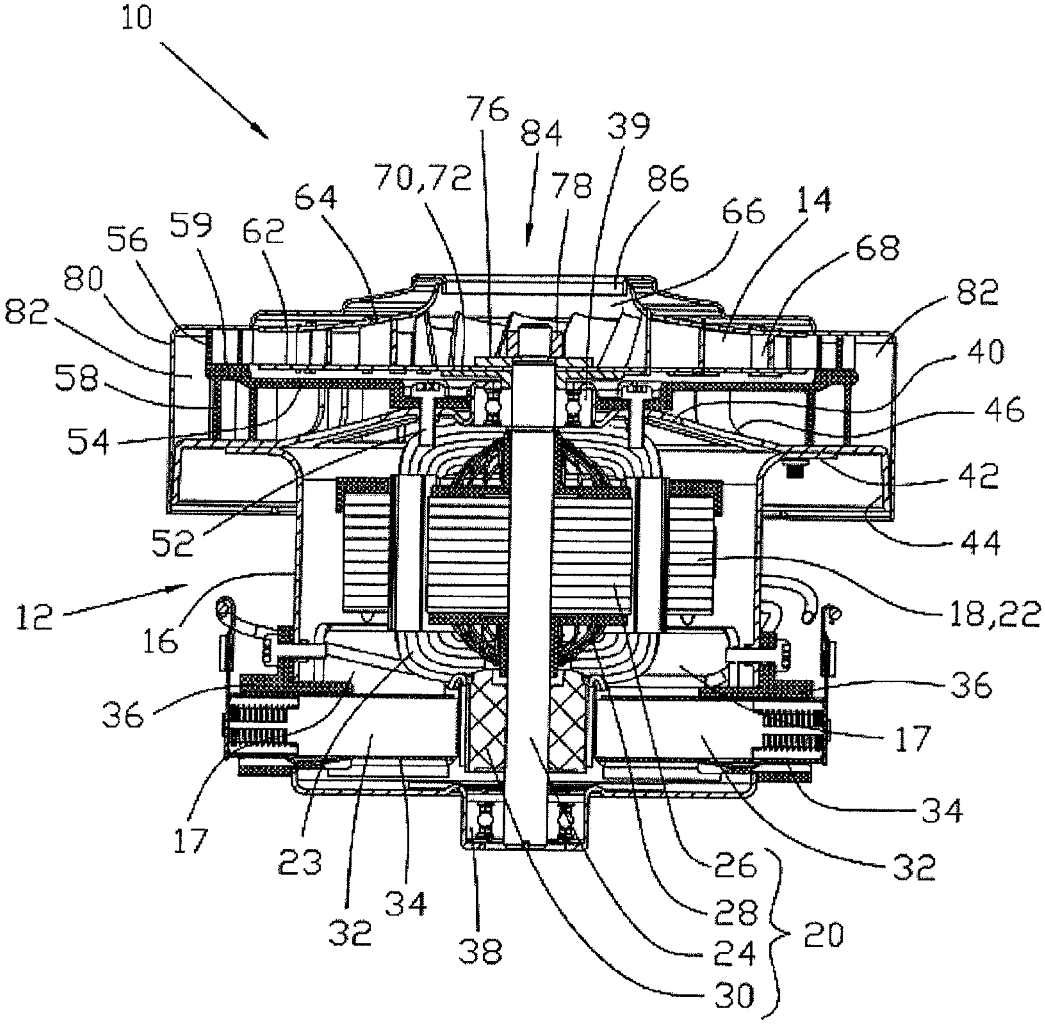
FIG. 1 is a sectional elevational view of a blower for a vacuum cleaner according to the present invention.

Referring firstly to FIG. 1, the construction of the blower will be described. The blower is shown in FIG. 1 in full section. The blower 10 has a motor, which here is a universal motor 12, driving an impeller 14. The motor 12 comprises a cup shaped housing 16 formed by deep drawing and stamping a sheet metal disc, preferably a disc of mild steel. Optionally, the housing may be a molded plastic part. The housing accommodates a stator 18 and a rotor 20. The stator comprises a laminated stator core 22 fixed to the housing 16 and having stator windings 23 wound about poles thereof. The rotor 20 comprises a shaft 24, a laminated rotor core 26 pressed onto the shaft for rotation therewith, rotor windings 28 wound about the poles of the rotor core and terminated on a commutator 30 fixed on the shaft next to the rotor core 26. Brush gear, in the form of cage brushes 32, make sliding electrical contact with the commutator for transferring electrical power to the rotor windings and slidably mounted within brush cages 34 fixed to the housing 16 by insulating cage holders 36.

The shaft 24 is journalled in bearings 38, 39, bearing 38 being supported by the closed bottom of the housing 16 and bearing 39 by a bearing bracket 40 extending across the open end of the housing 16. The bearing bracket 40 is preferably formed by stamping a sheet metal blank, preferable of mild steel. Optionally, the bearing may be supported directly by the diffuser, within a bearing hub formed in the diffuser, eliminating the need for a separate bearing bracket. The housing 16 has an outwardly extending flange 42 at its open end and the bearing bracket 40 extends across and is fixed to the flange 42. The bearing bracket 40 extends beyond flange 42 and is turned axially forming an axial extension 44 which extends about the housing but spaced therefrom. The function of this axial extension 44 will be explained shortly.

A number of large apertures 46 are formed in the bearing bracket 40 so as to allow the air free passage into the inner volume of the housing 16.

A diffuser 50 is mounted to the outside of the bearing bracket 40, preferably by screws 52. The diffuser has a central plate like portion 54 with diffuser vanes 56 on the upper surface and return guide vanes 58 on the lower surface. The diffuser vanes 56 surround the impeller 14 which has a flat lower plate 62, a curved upper plate 64 having a central opening 66 and a plurality of blades 68 connecting the upper and lower plates. The lower plate 62 sits on a spacer 70 fitted to the shaft 24. The spacer 70 has a large flange 72 which supports the lower plate 62 of the impeller 14. The spacer 70 sits on the inner race of the upper bearing 39. The shaft 24 extends through a hole in the lower plate 62. A washer 76 is placed on top of the lower plate 62 and a nut 78 screws into the end of the shaft 24 clamping the lower plate 62 between the flanged spacer 70 and the washer 76 so as to rotate the impeller with the shaft.

A cover 80, which is formed by drawing a sheet metal disc, is fitted over the impeller, diffuser and bearing bracket to define a working air chamber 82. An opening 84 in the cover 80 defines an inlet for the blower. The opening 84 has an inwardly formed lip 86 which cooperates with the central opening 66 in the upper plate 64 to restrict air recirculating within the air chamber 82 across the impeller 14.

The cover 80 makes contact with the upper end of the diffuser vanes 56 to add rigidity to the structure and extends axially down to and presses over the axial extension 44 of the bearing bracket 40. The cover 80 is crimped to the bearing bracket 40 to fix the cover 80 and to clamp the outer edge of the diffuser 50.

In use, electrical power is applied to the motor 12 to cause the rotor 30 to rotate. The impeller 14, being fixed to the shaft 24, is driven by the rotor 20 causing air to be drawn into the impeller through the inlet 84 in the cover 80 and expelled radially from the impeller 14 and through the passageways defined by the vanes on the diffuser and with the cover 80 direct the air flow from the upper surface of the diffuser around the outer edge of the diffuser and into the passageways formed between the return guide vanes 58 on the lower surface of the diffuser 50. The return guide vanes 58 direct the air inwardly and axially through the openings 46 in the bearing bracket 40 and into the housing 16 where the air passes over the stator and rotor before being exhausted through ports 17 in the lower portion of the housing as shown in FIG. 1.

As may be realized, the diffuser plays an important part in the efficiency of the air flow and in particular, in the turning and transferring of the air from the impeller and into the housing. Of course, restrictions within the housing caused by the rotor and stator can play an important part also but this can be easily overcome by making the passages in the housing large.

This invention constitutes an improvement in the diffuser to increase the efficiency of the air flow path and hence, the efficiency of the complete blower. Much research has been done on the angles of the diffuser vanes and the angle they make with the impeller to obtain efficient transfer of the air from the impeller to the diffuser. While this is important, further gains can be achieved by matching the angles of the diffuser vanes and the return guide vanes to improve the flow around the edge of the diffuser or the coupling between the diffuser vanes and the return guide vanes.

We have discovered that two angles are important. Angle A which is the angle that the diffuser vanes make with the impeller and Angle B which is the angle the return guide vanes make with the outer periphery of the diffuser. These angles shall be more clearly described hereinafter.

By using an angle A in the range of 4° to 6°, and an angle B in the range of 6° to 20°, an increase in efficiency can be achieved.

Table A shows the effect of varying angle A when angle B is set at 15°.

TABLE A

| Angle A | Efficiency (%) |
|---|---|
| 2 degrees | 73.1 |
| 3 degrees | 73.1 |
| 4 degrees | 74.7 |
| 5 degrees | 74.7 |
| 6 degrees | 74.3 |
| 7 degrees | 73.9 |
| 8 degrees | 73.7 |

Table B shows the effect of varying angle B when angle A is set at 5°.

TABLE B

| Angle B | Efficiency (%) |
|---|---|
| 4 degrees | 73.9 |
| 5 degrees | 73.9 |
| 6 degrees | 74.8 |
| 10 degrees | 74.9 |
| 15 degrees | 74.7 |
| 20 degrees | 74.3 |

From Table A, we see that efficiency peaks between 4° and 5° at an efficiency of 74.7%. We have taken +74% as being a desirable result.

From Table B, we see that the efficiency peaks for angle B at about 10°. Again, we have taken +74% as being a desirable result.

Thus, we see that a desirable result is obtained with a diffuser vane angle between 4° and 6°, and a return guide vane angle between 6° and 20° with an optimum arrangement being angle A set to 5° and angle B set to 10°.

Figure 2:
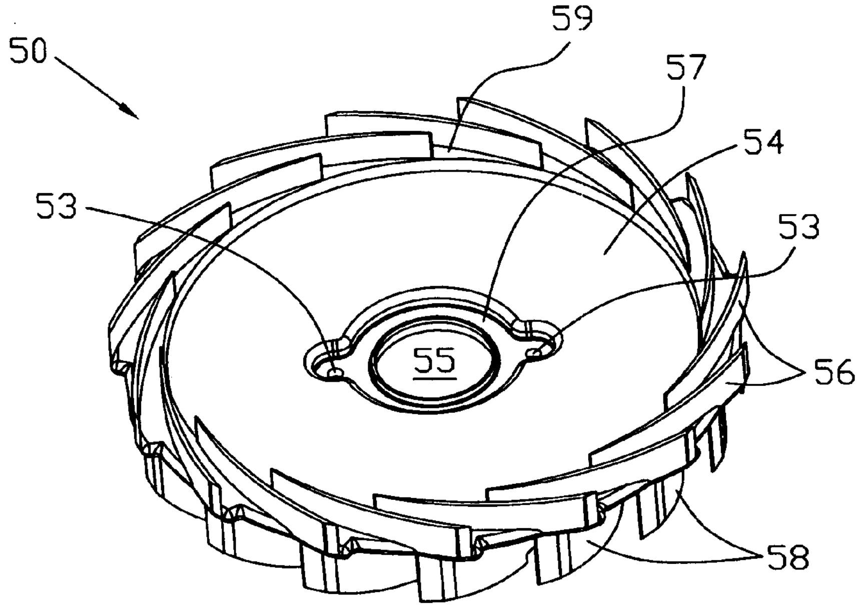
FIG. 2 is a perspective view of a diffuser, being a part of the blower of FIG. 1.
Figure 3:
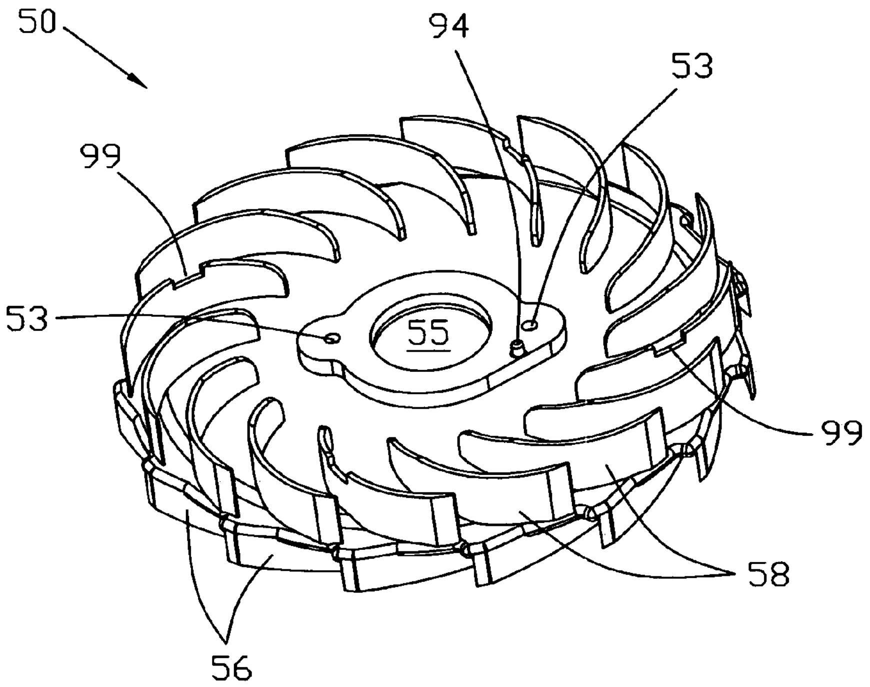
FIG. 3 is a perspective view of the diffuser of FIG. 2, showing the other side.

Turning now to FIGS. 2 and 3 where the diffuser 50 is shown in perspective view. In FIG. 2, the diffuser is shown in the upright position. The diffuser has a plate like portion 54 with a central aperture 55 which, in this case, accommodates a bearing hub of the bearing bracket 40. An annular recess 57 with two ears is formed about the central aperture. This recess 57 accepts a washer which, with the aid of two screws 52 which pass through holes 53 in the two ears, clamps the diffuser 50 to the bearing bracket 40.

Towards the outer periphery of the plate 54 is a stepped portion forming a thickened ring 59 on the edge of the plate 54. From this ring 59, diffuser vanes 56 extend upwards, and in a curved path across the ring to the outer edge of the diffuser 50. Each diffuser vane 56 has a chamfered outer edge to give a sharp trailing edge to the vane. The ring 59 forms a recess in which the impeller resides, giving a smoother transition between the impeller 14 and the diffuser vanes 56.

Figure 4:
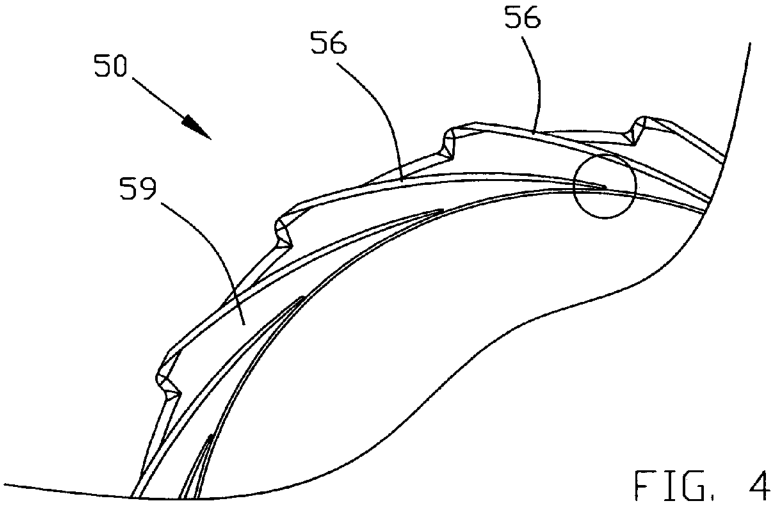
FIG. 4 is an enlarged plan view of a portion of the diffuser of FIG. 2.

Angle A, the angle the diffuser vane 56 makes with the impeller 14, is described with reference to FIGS. 4 and 5. FIG. 4 shows a portion of the diffuser 50 in plan view and FIG. 5 is an enlarged view of the area circled in FIG. 4.

Figure 5:
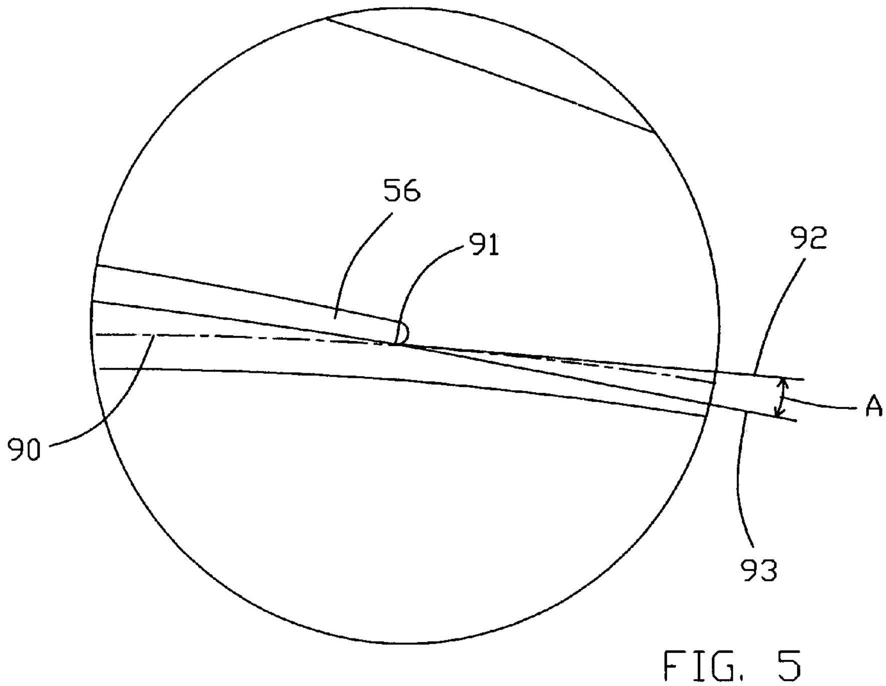
FIG. 5 is a further enlargement of the part of the diffuser of FIG. 4.

In FIG. 5, the inner end of one diffuser vane 56 is visible along with the stepped edge of the ring 59. Chain line 90 represents an imaginary circle concentric with the impeller 14 and co-axial with the shaft, which touches the inner ends of each diffuser vane 56. The tangent to this circle 90 at the point 91 where it touches the vane 56 is represented by line 92. Line 93 represents the tangent to the curve of the vane 56 at point 91. Angle A is the angle formed by the two lines 92 and 93.

FIG. 3 is a perspective view of the lower side of the diffuser 50. The central aperture 55 is seen surrounded by a raised portion corresponding to the recessed area 57 for the clamp washer on the upper side. A small projection 94 projecting from the raised area forms a key for aligning the diffuser 50 with the bearing bracket 40 during assembly.

Spaced about the periphery is a plurality of curved vanes forming the return guide vanes 58. These vanes form passageways for channeling or guiding the air flow from the periphery of the diffuser towards the center for passing through the openings 46 in the bearing bracket 40 to enter the housing 16. The return guide vanes 58 guide the swirling air flow radially inward and axially downward into the housing. The radially outer edge of each return guide vane 58 is chamfered, similar to the trailing edges of the diffuser vanes 56 to form a sharp leading edge. The peripheral edge of the diffuser is notched between the vanes 56, 58 to assist in moving the air flow from the upper passageways to the lower passageways. A step corresponding to the step on the upper side of the diffuser is visible. Notches 99 in some vanes 58 are provided to clear the screws used to fix the bearing bracket 40 to the flange 42 of the housing 16.

Figure 6:
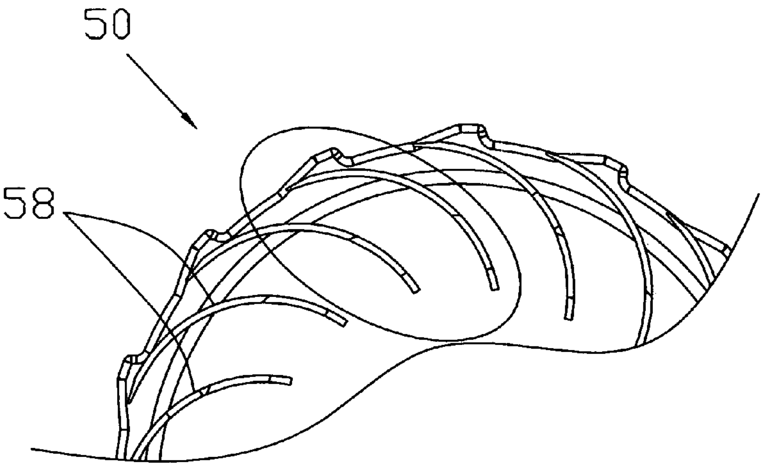
FIG. 6 is an enlarged plan view of a part of the diffuser of FIG. 3.
Figure 7:
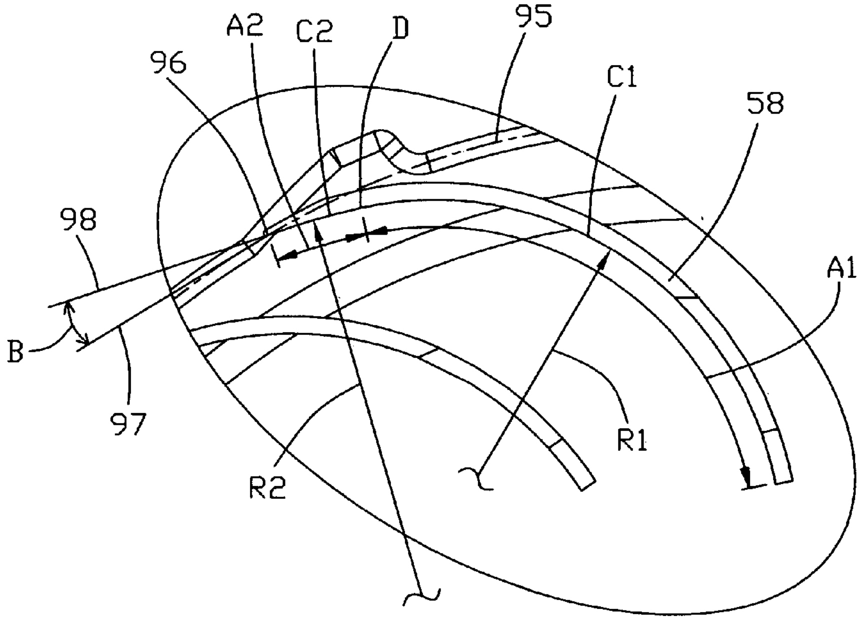
FIG. 7 is a further enlargement of the part of the diffuser of FIG. 6.

Angle B, the angle the return guide vanes make with the outer edge of the diffuser, is described with the aid of FIGS. 6 and 7. FIG. 6 is a portion of the underside of the diffuser 50 showing the return guide vanes 58 in plan view whereas FIG. 7 is an enlarged view of the area circled in FIG. 6.

Chain line 95 represents an imaginary circle co-axial with the motor shaft and joins or touches the radially outer edge or leading edge of the return guide vanes 58 at the radially inner surface of the vane indicated by point 96. Line 97 represents the tangent to circle 95 at point 96. Line 98 represents a tangent to the inner curved surface of the return guide vane 58 at point 96. Angle B is the angle formed between the lines 97 and 98.

Another consideration in the efficiency of the diffuser which may be overlooked is in the shape of the return guide vanes 58. In the preferred embodiment, the return guide vanes 58 extend generally radially and circumferentially across the lower face of the diffuser from the radially outer edge to a radially inner location stopping before reaching the center which, in use, is occupied by the bearing bracket. The path of each return guide vane 58 can be described as the Smooth joining or cross over of two curves C1 and C2. Curve C1 has a radius of R1 and a length of A1. Curve C2 has a radius of R2 and a length of A2.

To achieve a smooth transition between the curves, C1 and C2 are tangential as indicated by point D. That is, both C1 and C2 have a center lying on a common radial line and both curves have a common point of intersection on this line and curve in the same direction. Curve C1 is the trailing portion of the return guide vane and curve C2 is the leading portion of the return guide vane as considered in the air flow direction.

The relative sizes of the curves C1 and C2 and the relative lengths of the curves, i.e., A1 and A2, are used to further define the curves. We have found that the efficiency of the diffuser increases when R1 is less than R2 and in the preferred embodiment, R2 is 2×R1 or the ration of R1:R2 is 1:2. Also, the length of the curves is desirable in the range of A1 is 3 to 6 times the length of A2, i.e., 3<=A1/A2<=6. In the preferred embodiment, A1=4×A2.

The trailing edge of the return guide vanes 58 may be rounded as shown in FIG. 3 or otherwise tapered to aid mixing of the air flows as the air leaves the channels formed between the return guide vanes.

Angle A is also known as the diffuser vane attack angle or inlet angle. Angle B is also known as the return guide vane attack angle.

Although we have described the housing and bearing bracket as being formed from sheet metal, preferably mild steel sheet and by drawing and/or stamped, it is possible to make the housing by injection molding an engineering plastics material and to integrate the bearing bracket directly into the diffuser. However to do this may slightly adversely affect efficiency due to the difference in material of the diffuser required to strengthen the diffuser to have enough strength to support the bearing which may put some limitation on the thickness of the vanes and the motor may operate at a higher temperature due to the insulating effect of the plastics material of the housing.

In the preferred embodiment, the diffuser has 15 diffuser vanes and 16 return guide vanes. This combination of vanes produces a diffuser which has a beneficial effect on the noise level of the blower without detrimentally affecting performance.

The embodiment described above is given by way of example only and various modifications will be apparent to persons skilled in the art without departing from the scope of the invention as defined in the appended claims.

The invention claimed is:

1. A blower for a vacuum cleaner or the like, comprising:

a housing;

an electric motor accommodated within the housing and having a stator and a rotor;

an impeller fixed to the rotor for rotation therewith;

a diffuser located at a first end of the housing and located between the impeller and the housing; and a cover, fixed to the first end of the housing and covering the diffuser and impeller, the cover having an aperture forming an inlet port for the impeller;

wherein the diffuser has a plate like portion which extends adjacent a rear surface of the impeller and having on one side thereof at a peripheral edge, a plurality of diffuser vanes extending perpendicularly from the plate like portion and extending along respective curves from adjacent a peripheral edge of the impeller to a peripheral edge of the diffuser and having therebetween a plurality of passageways and having on a second surface thereof a plurality of return guide vanes extending perpendicularly from the plate like portion and following respective curves from the peripheral edge of the diffuser to a radially intermediate location and forming a second plurality of passageways therebetween for leading air from the periphery of the diffuser, inwardly towards and into the housing to cool the motor; and wherein the diffuser vanes form an angle A with the peripheral edge of the impeller and an inner side of the return guide vanes form an angle B with the outer edge of the diffuser such that the angle A is in the range of 4° to 6° and the angle B is in the range of 6° to 20°.

2. The blower of claim 1, wherein the first end of the housing is open and a bearing bracket spans the first end and supports a bearing for the shaft of the rotor and the diffuser is fixed to the bearing bracket.

3. The blower of claim 2, wherein the housing has a flange at the first end and the bearing bracket is fixed to the flange and has an axially extending ring located radially outwardly of the flange and the cover is fixed to said ring.

4. The blower of claim 3, wherein the cover closes one side of the diffuser vane passageways and the bearing bracket closes one side of the return guide vane passageways.

5. The blower of claim 4, wherein there exists an annular space between the radially outer edge of the diffuser and the cover.

6. The blower of claim 1, wherein the angle A is 5° and the angle B is 10°.

7. The blower of claim 1, wherein the diffuser has 15 diffuser vanes and 16 return guide vanes.

8. The blower of claim 1, wherein the curve of the return guide vanes is a smooth joining of a first arc with a second arc, the first arc forming a trailing portion of the return guide vane and the second arc forming a leading portion of the return guide vane.

9. The blower of claim 8, wherein the second arc has a radius which is greater than the radius of the first arc.

10. The blower of claim 9, wherein the radius of the second arc is twice the radius of the first arc.

11. The blower of claim 8, wherein the first arc and the second arc meet at a tangent.

12. The blower of claim 11, wherein the first and second arcs each have a center lying on a common radial line.

13. The blower of claim 8, wherein the length of the first arc is three to six times the length of the second arc.

14. The blower of claim 13, wherein the length of the first arc is four times the length of the second arc.

15. The blower of claim 6, wherein the diffuser has 15 diffuser vanes and 16 return guide vanes, wherein the curve of the return guide vanes is formed by smoothly joining a first arc with a second arc at a tangent thereof, the second arc having a radius which is twice the radius of the first arc and both arcs having a center lying on a common radial line, with the first arc forming a trailing portion of the return guide vane and the second arc forming a leading portion of the return guide vane.

16. The blower of claim 1, wherein the inner end of one diffuser vane is curved and contacts an imaginary circle concentric with the impeller and co-axial with the motor shaft, and a tangent to the imaginary circle at the point of contact of the inner end of the one diffuser vane and the imaginary circle is represented by a first line, and a second line represents a tangent to the curve of the one diffuser vane at said point of contact, and the first and second lines form angle A, and wherein a radially outer or leading edge of one return guide vane is curved and contacts an imaginary circle coaxial with the motor shaft, and a tangent to the imaginary circle at the point of contact of the one return guide vane and the imaginary circle is represented by a third line, and a fourth line represents a tangent to the curve of the one return guide vane at said point of contact, and the third and fourth lines form angle B.

* * * * *